United States Patent
Milani

(10) Patent No.: US 12,385,739 B2
(45) Date of Patent: Aug. 12, 2025

(54) MEMS GYROSCOPE DEVICE WITH IMPROVED HOT STARTUP AND CORRESPONDING METHOD

(71) Applicant: STMICROELECTRONICS S.r.l., Agrate Brianza (IT)

(72) Inventor: Marco Milani, Bellinzago Novarese (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 361 days.

(21) Appl. No.: 18/057,711

(22) Filed: Nov. 21, 2022

(65) Prior Publication Data
US 2023/0168089 A1  Jun. 1, 2023

(30) Foreign Application Priority Data
Nov. 30, 2021 (IT) .......................... 102021000030266

(51) Int. Cl.
*G01C 19/5712* (2012.01)
(52) U.S. Cl.
CPC ................................ *G01C 19/5712* (2013.01)
(58) Field of Classification Search
CPC .......................... G01C 19/5712; G01C 19/5776
See application file for complete search history.

(56) References Cited

U.S. PATENT DOCUMENTS

| | | | |
|---|---|---|---|
| 2008/0105054 A1* | 5/2008 | Kanai | G01P 15/097 331/116 R |
| 2008/0178672 A1* | 7/2008 | Kanai | H03B 5/36 331/154 |
| 2009/0114015 A1* | 5/2009 | Steinlechner | G01C 25/005 73/504.12 |
| 2009/0133496 A1* | 5/2009 | Kanai | G01C 19/56 73/504.12 |
| 2010/0206074 A1* | 8/2010 | Yoshida | G01C 19/56 73/504.12 |
| 2011/0121907 A1* | 5/2011 | Kanai | G01C 19/56 331/109 |
| 2012/0312095 A1 | 12/2012 | Hanson et al. | |
| 2013/0249642 A1 | 9/2013 | Rizzo Piazza Roncoroni et al. | |
| 2014/0251009 A1* | 9/2014 | Schlarmann | G01C 19/5776 73/504.12 |

(Continued)

*Primary Examiner* — David J Bolduc
(74) *Attorney, Agent, or Firm* — SEED IP LAW GROUP LLP

(57) ABSTRACT

A microelectromechanical gyroscope device has: a detection structure, provided with a mobile mass; and an integrated electronic circuit, coupled to the detection structure and which provides a bias signal to the detection structure to cause its oscillation at a resonance frequency and acquires a detection signal from the detection structure indicative of a detected angular velocity. When the gyroscope device is powered, the integrated electronic circuit implements a start-up phase, following a previous power-down, wherein the mobile mass is biased to have an increase in the oscillation up to a target oscillation amplitude, followed by a maintenance phase at the target oscillation amplitude. The integrated electronic circuit is provided with a time counter stage for measuring a duration of a time interval from the previous power-down and adjusts the bias of the mobile mass during the start-up phase as a function of the measured duration of the time interval.

20 Claims, 3 Drawing Sheets

(56) References Cited

U.S. PATENT DOCUMENTS

| | | | |
|---|---|---|---|
| 2014/0305206 A1 | 10/2014 | Maki et al. | |
| 2015/0122022 A1* | 5/2015 | Maki | G01C 19/5614 |
| | | | 73/504.16 |
| 2015/0276405 A1* | 10/2015 | Rastegar | G01C 19/5712 |
| | | | 73/504.12 |
| 2016/0003616 A1* | 1/2016 | Kato | G01C 19/5776 |
| | | | 73/504.12 |
| 2017/0131116 A1* | 5/2017 | Wu | G01C 19/56 |
| 2018/0041217 A1* | 2/2018 | Murakami | H03L 7/091 |
| 2018/0224281 A1* | 8/2018 | Wu | G01P 15/12 |
| 2019/0383613 A1* | 12/2019 | Zhang | G01C 19/58 |
| 2020/0408523 A1 | 12/2020 | Fang et al. | |
| 2021/0356272 A1* | 11/2021 | Dietrich | G01C 19/5776 |
| 2023/0003525 A1* | 1/2023 | Diazzi | G01C 19/567 |

\* cited by examiner

MEMS GYROSCOPE DEVICE WITH IMPROVED HOT STARTUP AND CORRESPONDING METHOD

BACKGROUND

Technical Field

The present solution relates to a gyroscope device of the MEMS ("Micro-Electro-Mechanical Sensor") type, having an improved hot start-up; the present solution also relates to an operating method of the gyroscope device, with particular reference to the aforementioned hot start-up.

Description of the Related Art

In a known manner, micromanufacturing techniques allow to manufacture microelectromechanical systems (MEMS) from semiconductor material layers, which have been deposited (for example a polycrystalline silicon layer) or grown (for example an epitaxial layer above sacrificial layers, which are removed by etching. Inertial sensors, accelerometers and gyroscopes provided with this technology are having increasing success, for example in the automotive field, in the field of inertial navigation, or in the field of mobile or portable devices.

In particular, integrated gyroscopes of semiconductor material made using MEMS technology (hereinafter simply referred to as MEMS gyroscopes) are known, which operate on the basis of the relative acceleration theorem, exploiting Coriolis acceleration.

When a rotation at a certain angular velocity (the value whereof is to be detected) is applied to a mobile mass of the MEMS gyroscope, which is driven with a linear velocity, the mobile mass feels an apparent force, called Coriolis force, which determines a displacement thereof in a direction perpendicular to the direction of the linear driving velocity and to the axis about which the rotation occurs. The mobile mass is supported by elastic elements that allow a displacement thereof in the direction of the apparent force. According to Hooke's law, the displacement is proportional to the apparent force, such that the Coriolis force and the angular velocity value of the rotation that generated it may be detected from the displacement of the mobile mass.

The displacement of the mobile mass may, for example, be detected in a capacitive manner, determining, in a resonance condition, the capacitance variations caused by the movement of movable detection electrodes, integral with the mobile mass and coupled (for example in the so-called parallel-plate configuration, or in an interdigitated configuration) with fixed detection electrodes, so as to form a detection capacitor.

MEMS gyroscopes therefore generally comprise a detection structure, including the aforementioned mobile mass and the aforementioned detection electrodes; and also an ASIC (Application Specific Integrated Circuit) electronic circuit, electrically coupled to the detection structure, which receives at its input the capacitive variation produced by the detection capacitor and processes it for generating an electrical output signal, indicative of the angular velocity, which may be provided outside the MEMS gyroscope for subsequent processing.

The aforementioned ASIC electronic circuit and the detection structure are typically provided in respective dies of semiconductor material, which are arranged inside a package, which encloses and protects the same dies, also providing an electrical connection interface towards the outside environment.

The ASIC electronic circuit also implements a driving stage for driving of the mobile mass, maintaining it in oscillation at the resonance frequency with a desired amplitude (target amplitude), so that it may carry out the angular velocity detection by the aforementioned Coriolis effect.

In particular, the driving stage is configured, in an initial or start-up phase, to cause the oscillation to start and, subsequently, to maintain the oscillation at the desired amplitude, by a closed-loop (or feedback) control.

In this regard, FIG. 1A shows the trend over time of the driving displacement (or oscillation) $D_{osc}$ of the mobile mass after receiving, by the ASIC circuit, a MEMS gyroscope start-up signal at an initial time $t_0$.

In the example, this trend starts from an initial condition with null displacement and has a first phase (start-up phase) with a fast increase (a ramp increase) up to reaching a maintenance amplitude and a second phase (maintenance phase) of permanence at this maintenance amplitude for the entire duration of an angular velocity detection phase.

In particular, the aforementioned maintenance phase starts at a time ti, following time to, at which the driving oscillation $D_{osc}$ exceeds an amplitude threshold TH.

FIG. 1B shows the corresponding trend of a driving control signal $S_C$ (in particular a voltage signal) provided to the mobile mass by the aforementioned driving stage of the ASIC electronic circuit, which has, from reception of the aforementioned start-up signal, in the start-up phase, a high saturated value (that is, corresponding to a maximum control voltage), so as to cause fast increase of the mobile mass oscillation; and, in the maintenance phase, a suitable maintenance or steady state value, lower than the aforementioned high saturated value (this maintenance value being reached rapidly after time ti).

In the maintenance phase, the driving stage implements a closed-loop control of the oscillation amplitude, around the desired value, on the basis of a mobile mass oscillation amplitude detection signal (provided by suitable detection elements coupled to the same mobile mass).

In a known manner, the driving stage is required to provide, in the start-up phase, a maximum possible energy, to rapidly start the driving and make the start-up duration as short as possible; in fact, correct detection of the angular velocity by the gyroscope may be carried out only in the subsequent maintenance phase, when the driving oscillation of the mobile mass has reached the desired value.

In this first start-up phase, the driving control is an open-loop control, with the driving stage providing maximum energy (in the so-called full-steam mode); in this initial phase, the oscillation amplitude detection signal would be in any case too low to be distinguished from background noise.

A known problem affecting MEMS gyroscopes is represented by the so-called hot start-up. In particular, a hot start-up is defined as a power-up of the gyroscope that occurs close to a previous power-down, when the mobile mass is still in its oscillation movement; the oscillation movement of the mobile mass, in the absence of the driving signal, in fact decays in rather long times, of the order of hundreds of ms.

In these cases, the previously described start-up phase, with the supply of maximum energy to the mobile mass by the driving stage, may not be optimal.

In fact, the mobile mass may undergo an overshoot phenomenon, i.e., assume an oscillation amplitude greater than the desired amplitude; in the worst case, the oscillation amplitude may be such as to cause the mobile mass to hit corresponding stopper elements (so-called stoppers).

In this regard, FIG. 2A shows the trend of the driving oscillation $D_{osc}$ of the mobile mass, in different cases: a so-called "cold" start-up case, that is with a stationary mobile mass (desired condition), which corresponds to the trend shown previously in FIG. 1A; and four different "hot" start-up conditions, which differ for a different time interval between a previous power-down instant and the subsequent reception of the start-up signal (this time interval ranging from 5 ms to 100 ms).

As may be noted, in the worst hot start-up case, corresponding to the shortest time interval between the aforementioned power-down and power-up events, the mobile mass oscillation amplitude exceeds the target amplitude (before the driving control implemented by the driving stage brings the same oscillation amplitude back to the maintenance value).

The situation described may have a significant impact on the gyroscope performances, for a time that may also be quite long (tens of ms) from the beginning of the start-up phase, a time during which the gyroscope cannot provide a reliable detection.

In this regard, FIG. 2B shows the trend of the output signal $S_{out}$ of the gyroscope (indicative of the detected angular velocity), in the same cases discussed for FIG. 2A.

In the presence of a hot start-up, in all cases, an evident oscillation of the output signal $S_{out}$ is noted, which remains unstable for a rather long time; this oscillation has a greatest amplitude at the shortest time interval between the previous power-down instant and the subsequent reception of the start-up signal (case corresponding to the overshoot situation shown in FIG. 2A).

Such behavior of the gyroscope may be bad and not acceptable for various fields of use, for example for automotive or analogous applications, where high reliability and a prompt detection are required.

A known solution to overcome the problems associated with hot start-up events envisages preventing such events from occurring. In particular, this solution envisages that the application (the external electronic system), where the gyroscope is used, ensures a sufficient wait time interval after having commanded the power-down of the same gyroscope, such that it allows the mobile mass to stop its oscillation, so to ensure a cold start-up in case of the subsequent power-up.

The limits associated with this solution are, in an evident manner, the request for a wait time interval following each power-down of the gyroscope, this waiting being not feasible in various applications, as previously discussed.

Furthermore, a situation may occur wherein different applications (or external electronic systems) intervene to activate the power-down, respectively the start-up, of the gyroscope; in the event that these applications are independent and non-communicating with each other, implementing the aforementioned wait time interval may not be possible.

A further known solution envisages implementing detection of any residual mobile mass oscillation when the gyroscope is started and suitably adjusting the start-up phase, and in particular the driving energy provided to the mobile mass, as a function of this detection. In this solution, therefore, the start-up phase with full-steam approach (at maximum energy) is implemented only in the event that detection of the oscillation amplitude shows that the mobile mass is stationary before the beginning of the start-up phase.

However, also this solution has some drawbacks.

Firstly, this solution generally implies longer start-up times, due to the presence of the additional detection and evaluation phase of the mobile mass oscillation amplitude.

Furthermore, the possibility of error is high, due to the fact that the oscillation amplitude detection signal (on which the initial control is based) is very low and therefore susceptible to misinterpretations; for example, a cold start-up may be implemented instead of a hot start-up.

To overcome these errors, it is required to add further and sophisticated dedicated control electronics, thus increasing the size of the gyroscope device and the corresponding power consumption.

BRIEF SUMMARY

The present solution is directed to overcome the previously highlighted problems, and in particular to provide a hot start-up solution for a MEMS gyroscope device which is more efficient and has limited energy or resource consumption.

The present disclosure is directed to a microelectromechanical gyroscope device that includes a detection structure that includes a mobile mass and an integrated electronic circuit, coupled to the detection structure. The integrated electronic circuit is configured to provide a bias signal to the detection structure to cause oscillation at a resonance frequency; acquire a detection signal from the detection structure indicative of a detected angular velocity; receive a power-down signal; receive a start-up signal; and implement a start-up phase in response to the start-up signal that is received after a previous power-down phase. During the start-up phase the integrated electronic circuit is configured to: bias the mobile mass to increase the oscillation up to a target oscillation amplitude; and implement a maintenance phase in response to the target oscillation amplitude. The integrated electronic circuit includes a time counter configured to measure a duration of a time interval from the previous power-down phase and is configured to bias the mobile mass during the start-up phase as a function of the measured duration of the time interval.

The present disclosure is directed to a method that includes receiving a first power-down signal with an integrated circuit that is coupled to a detection structure of a micro-electromechanical system; initiating a first pre-power down phase by starting a counter; determining whether a time count value of the first pre-power down phase is greater than or less than a wait time interval; receiving a start-up signal before the time count value exceeds the wait time interval; and biasing the detection structure as a function of the time count value.

BRIEF DESCRIPTION OF THE SEVERAL VIEWS OF THE DRAWINGS

For a better understanding of the present disclosure, a preferred embodiment thereof is now described, purely by way of non-limiting example and with reference to the attached drawings, wherein.

DETAILED DESCRIPTION

As will be described in detail below, an aspect of the present solution stems from the observation that the mobile mass oscillation of the gyroscope decays in a decay time that is known or in any case determinable as a function of the characteristics and configuration of the same mobile mass (in particular, being proportional to its quality factor Q) and envisages suitably adjusting the start-up phase as a function of the time interval elapsed from a previous power-down command.

This elapsed time interval, which may be measured by a suitable counter (using, for example, a low-power oscillator), compared with the aforementioned decay time, allows to establish whether the mobile mass is still moving and in particular to establish whether the subsequent start-up corresponds to a cold start-up or, instead, to a hot start-up, in this case allowing to suitably adjust the way of implementing the same hot start-up.

Figure 3:
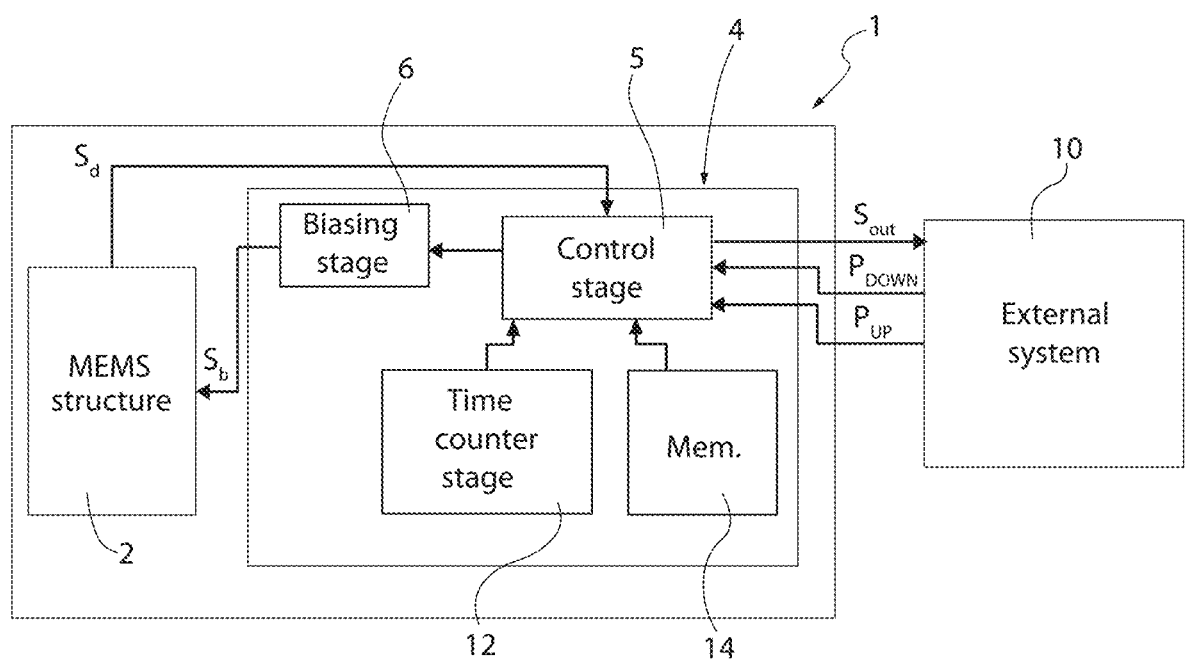
FIG. 3 is a block diagram of a gyroscope device according to an embodiment of the present solution.

FIG. 3 shows a gyroscope device 1, of a microelectromechanical, MEMS, type, which comprises: a detection structure 2, of a known type (not described in detail herein), provided with a mobile mass for detecting angular accelerations on the basis of Coriolis effect; and an integrated electronic circuit 4, ASIC (Application Specific Integrated Circuit), coupled to the detection structure 2.

The electronic circuit 4 is configured to provide bias signals $S_b$ to the same detection structure 2 to cause it to oscillate at the resonance frequency and furthermore to acquire detection signals $S_d$ from the same detection structure 2, indicative of the detected angular velocities.

As previously discussed, the detection structure 2 and the electronic circuit 4 may be integrated in a respective die of semiconductor material and the dies arranged, with suitable mutual electrical connections, in a same package of the gyroscope device 1.

In greater detail, the electronic circuit 4 comprises: a control stage 5, for example provided with a microcontroller, a processor resident in the ASIC or with a similar processing unit; and a biasing stage 6.

The control stage 5 is configured to receive, externally from the gyroscope device 1, for example from an external electronic system 10, shown schematically in FIG. 3, management signals based on which to control the operation of the same gyroscope device 1 and to provide to the same external electronic system 10 output signals Sous indicative of detected angular velocities.

In particular, the aforementioned management signals may include a power-up or start-up signal, denoted with $P_{UP}$, for causing the power-up or start-up of the gyroscope device 1, for example from a full power-down or an idle (inactivity) condition, and a stop or power-down signal, denoted with $P_{DOWN}$, for causing the power-down (turn-off) of the gyroscope device 1 and the return to the aforementioned condition, of full power-down or idle.

This external electronic system 10 may for example be an electronic unit of an electronic apparatus, for example of mobile or portable type (such as a smartphone, a tablet, a phablet, a smartwatch or other wearable device, a smart pen or the like), which uses the aforementioned gyroscope device 1 for detecting angular velocity.

Figure 1A:
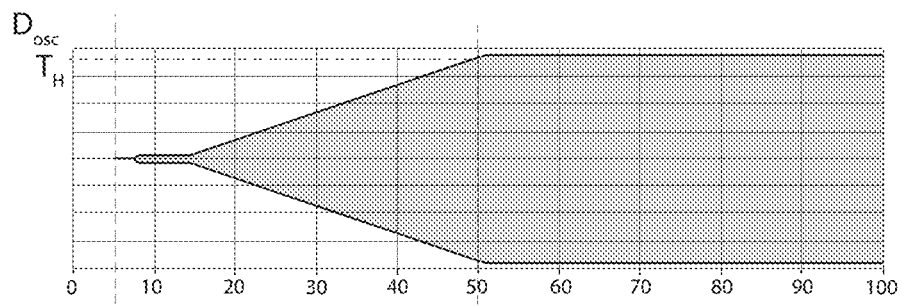
FIGS. 1A and 1B show plots of trends of quantities associated with the operation of a gyroscope device of a known type in a start-up phase.
Figure 1B:
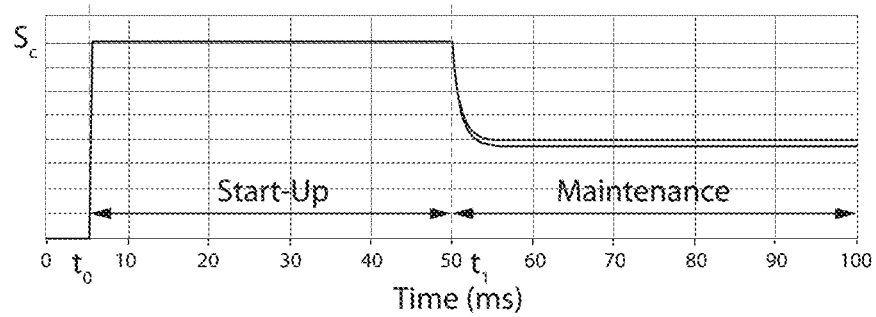

The biasing stage 6 of the electronic circuit 4 is controlled by the control stage 5 for generating the aforementioned bias signals $S_b$ for the detection structure 2, in particular during the start-up condition (following the reception of the aforementioned start-up signal $P_{UP}$), i.e., as previously discussed with reference to FIGS. 1A and 1B, to cause the mobile mass to rapidly oscillate at the resonance frequency and at the desired maintenance amplitude.

According to a particular aspect of the present solution, the electronic circuit 4 further comprises a time counter stage 12, controlled by the control stage 5 and configured to measure a wait time interval from reception of the aforementioned power-down signal $P_{DOWN}$. In particular, the value of this wait time interval corresponds to the oscillation decay time of the mobile mass of the detection structure 2.

The electronic circuit 4 may further comprise a non-volatile memory 14, coupled to the control stage 5 and storing a suitable stored value $T_{MEM}$, associated with the aforementioned wait time interval.

The wait time interval value may be determined in the design stage of the gyroscope device 1, based on constructive and operating characteristics of the detection structure 2 and in particular, as previously indicated, on the basis of the quality factor Q associated with the corresponding mobile mass.

This value may also advantageously be adjusted (with so-called trimming operations) during manufacturing of the gyroscope device 1 and consequently stored in the non-volatile memory 14 as the aforementioned stored value $T_{MEM}$, so as to adapt to the actual real characteristics of the gyroscope device 1.

Figure 4:
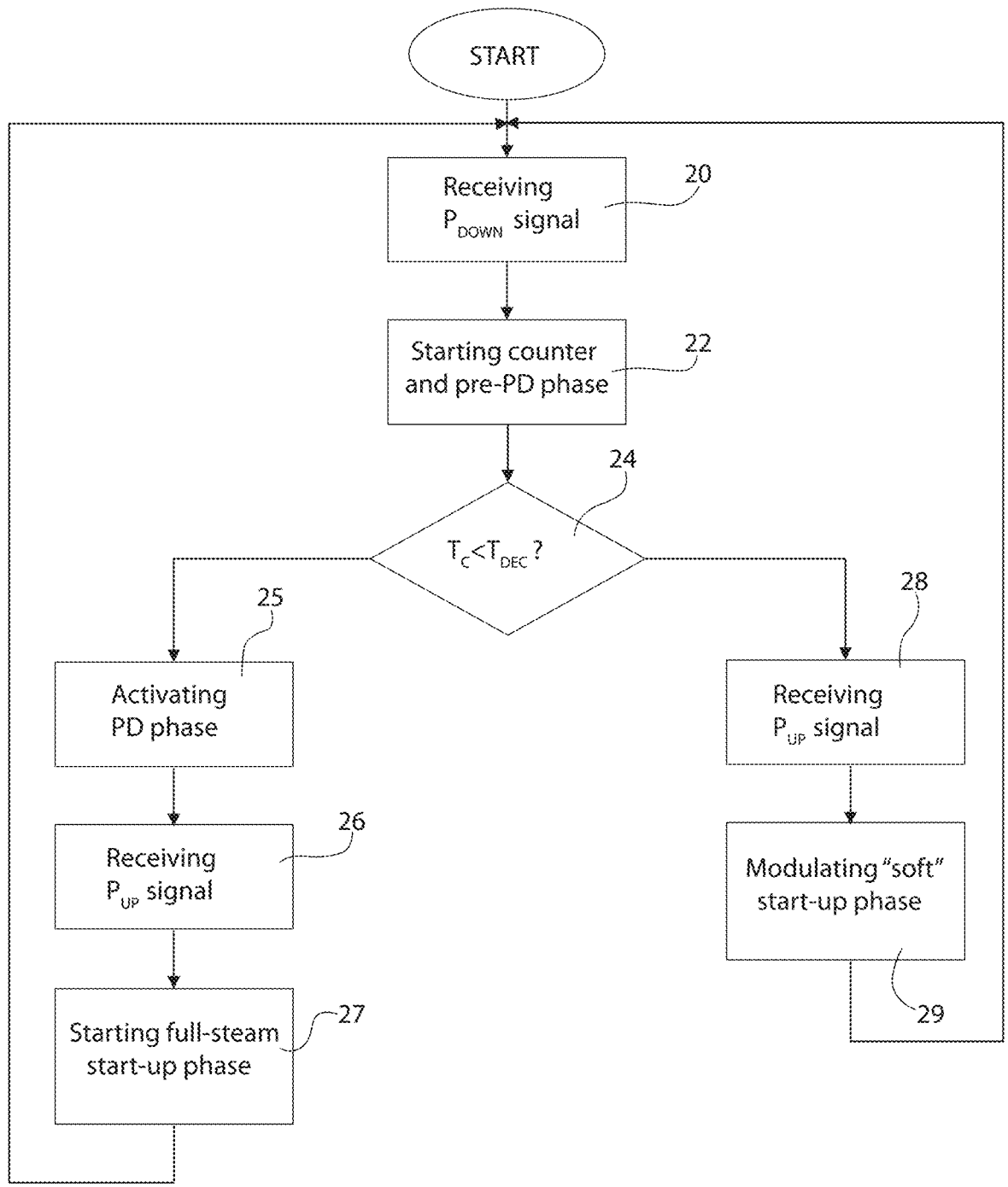
FIG. 4 is a flow chart relating to the operation of the gyroscope device of FIG. 3.

The operation of the gyroscope device 1, relative to management of a corresponding start-up mode, is now discussed in greater detail, also with reference to FIG. 4.

In an initial step, denoted with 20, which is supposed to correspond to a normal operating phase of the gyroscope device 1 (i.e., to a maintenance phase, see the previous discussion, with the mobile mass which oscillates at the desired amplitude and is operative for the angular velocity detection), the control stage 5 receives the power-down signal $P_{DOWN}$.

According to an aspect of the present solution, instead of directly controlling power-down of the gyroscope device 1 (as in traditional solutions), the control stage 5 determines, step 22, the start of a pre-power down, pre-PD, phase and in particular starts the time count by the time counter stage 12 (which is supposed to have been previously reset, so to start from an initial null count value).

In this pre-power down phase, the control stage 5 controls power-down of a large part of the gyroscope device 1 (in particular by interrupting biasing of the mobile mass of the detection structure 2, the oscillation whereof thus begins to decay), except the aforementioned time counter stage 12.

As indicated at step 24, the control stage 5 then monitors, for the entire duration of the aforementioned pre-power down phase, the time count value (denoted with $T_C$) and assesses whether the wait time interval, corresponding to the decay time (here denoted with $T_{DEC}$) of the oscillation of the mobile mass of the detection structure 2, has been reached.

For instance, the control stage 5 compares the time count value $T_C$ with the stored value $T_{MEM}$ present in the non-volatile memory 14.

If the wait time interval corresponding to the decay time of the mobile mass oscillation has elapsed from the reception of the power-down signal $P_{DOWN}$ (that is, if the time count value $T_C$ reaches the design value or the stored value $T_{MEM}$), the control stage 5 determines the end of the aforementioned pre-power down phase and, step 25, activates the actual power-down, PD, phase of the gyroscope device 1 (in a per-se known manner, not discussed in detail herein).

In particular, the control stage 5 also determines the power-down of the time counter stage 12 (the count whereof is thus reset).

Subsequently, step 26, the reception of the start-up signal $P_{UP}$ awakens the control stage 5 (acting as an interrupt) and the same control stage 5 determines the start of the start-up phase for the fast increase of the oscillation of the mobile mass of the detection structure 2 up to reaching the maintenance amplitude.

In particular, the control stage 5 implements in this case, step 27, a cold start-up, with the supply of full energy (with full-steam mode) to the detection structure 2 by the biasing stage 6, since the same control stage 5 has previously verified that the mobile mass was stationary, a time interval greater than the decay time of the oscillation of the same mobile mass having elapsed from the previous power-down signal $P_{DOWN}$.

Reversely, as shown at step 28, if the control stage 5 receives the start-up signal $P_{UP}$ before the wait time interval corresponding to the decay time of the mobile mass oscillation has elapsed (i.e., before the time count value $T_C$ has reached the design or stored value $T_{MEM}$), the same control stage 5 determines the occurrence of a hot start-up, with a new power-up request when the mobile mass of the detection structure 2 is still oscillating.

As a result, according to an aspect of the present solution, the control stage 5 is configured to suitably adjust the start-up phase, to avoid possible drawbacks such as overshoot of the mobile mass. In other words, the control stage 5 implements in this case a "soft" start-up, as shown at step 29.

In particular, the control stage 5 adjusts, through the biasing stage 6, the amount of bias energy and the mode of supplying the same bias energy to the mobile mass, as a function of the current time count value $T_C$, that is as a function of the time interval elapsed from the previous power-down.

In general, the shorter the time elapsed (and therefore the lower the time count value $T_C$), the greater a limitation implemented by the control stage 5 to the bias energy provided by the biasing stage 6 to the mobile mass. Reversely, the higher the time count value $T_C$, the lower the limitation implemented by the control stage 5 to the energy provided by the biasing stage 6 to the mobile mass, thus approaching the full-steam mode envisaged for a cold start-up.

In any case, both from step 29 and from the aforementioned step 27, at the end of the start-up phase, the control stage 5 controls the biasing stage 6 to implement the maintenance phase for sustaining the oscillation of the mobile mass of the detection structure 2, in a per se known manner, so that the procedure returns to the aforementioned initial step 20, to await the reception of a new power-down signal.

In a possible implementation, which is now described purely by way of a non-limiting example, the start-up phase, when the gyroscope device 1 is powered-up, may be divided into a plurality of sub-phases, in the example:
 a first sub-phase, wherein the biasing stage 6 (controlled by the control stage 5) starts the mobile mass oscillation;
 a second sub-phase, waiting for the clock of the electronic circuit 4 to adapt to the mobile mass oscillation; and
 a third sub-phase, wherein the maximum possible energy is applied for a predefined time.

Afterwards, the control stage 5 implements the maintenance phase for sustaining the oscillation, with the closed-loop control, during which the reading of the oscillation amplitude is enabled and the feedback control around the maintenance amplitude is implemented.

According to an aspect of the present solution, the adjustment of the start-up phase by the control stage 5 may envisage, in this case, eliminating one or more of the sub-phases into which the start-up phase is normally divided (i.e., in case of a cold start-up) and/or reducing the duration or the associated bias energy of one or more of the same sub-phases, again as a function of the current time count value $T_C$, that is of the time interval elapsed from the previous power-down.

Purely by way of example, assuming that the decay time of the mobile mass (corresponding to the stored value $T_{MEM}$ in the non-volatile memory 14) is of the order of 200 ms, the control stage 5 may be configured to:
 in the event that the time count value $T_C$ is lower than half the stored value $T_{MEM}$ (in the example<100 ms), eliminate the first and the third sub-phases and implement only the second wait sub-phase;
 in the event that the time count value $T_C$ is comprised in the example between 100 ms and 150 ms (i.e., between ½ and ¾ of the stored value $T_{MEM}$), eliminate the first sub-phase and shorten the third sub-phase, in particular by forcing the maximum energy for a reduced time interval;
 in the event that the time count value $T_C$ is comprised in the example between 150 ms and 200 ms (i.e., between ¾ of the stored value $T_{MEM}$ and the same stored value $T_{MEM}$), eliminate only the first sub-phase.

The advantages of the solution described are clear from the preceding description.

In any case, it is again highlighted that this solution allows the problems associated with the hot start-up of the gyroscope device to be effectively avoided, in particular by avoiding possible overshoots of the mobile mass and considerably reducing the oscillation of the output signal $S_{out}$ of the gyroscope device 1 in the period immediately following the start-up phase.

Figure 2A:
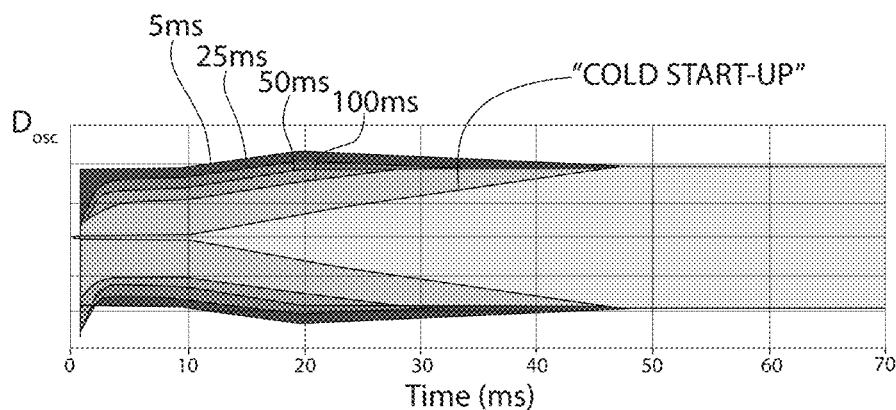
FIGS. 2A and 2B show plots of trends of quantities associated with the operation of the known gyroscope device in a hot start-up condition.
Figure 2B:
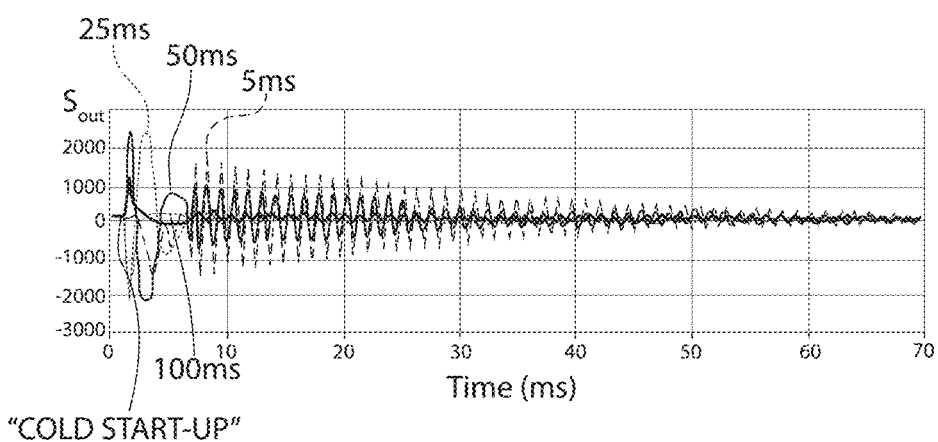
Figure 5:
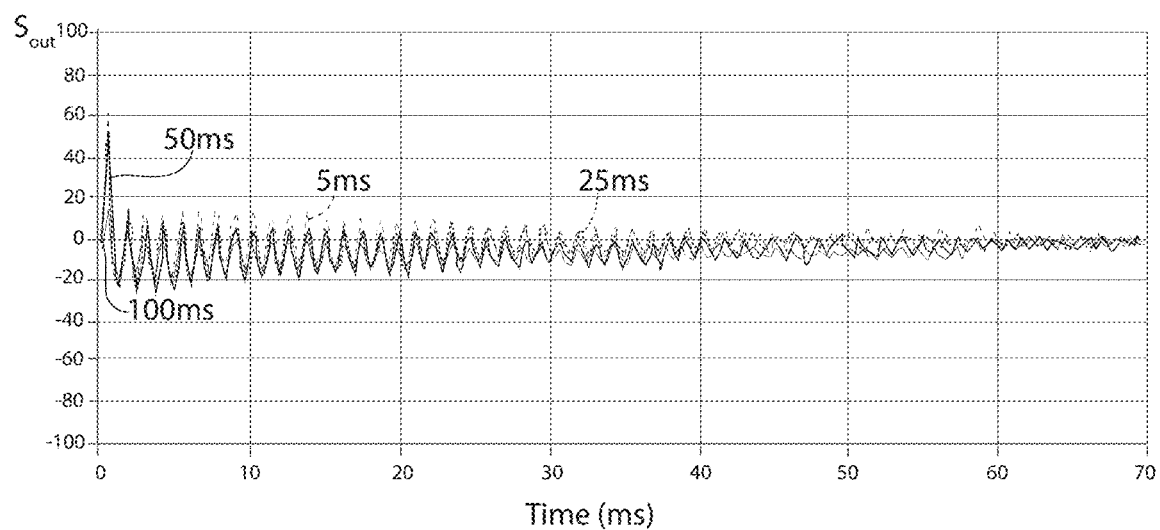
FIG. 5 shows the trend of output signals for the gyroscope device of FIG. 3.

In this regard, FIG. 5 shows the trend of the aforementioned output signal $S_{out}$ of the gyroscope device 1, considering the same cases shown in FIG. 2B for a traditional gyroscope, highlighting the significant reduction in the oscillation amplitude, regardless of the time elapsed between the power-down and the subsequent start-up.

The solution described requires a substantially negligible increase in energy consumption, this increase being substantially associated with the power-up of the time counter stage 12 in the pre-power down phase, having very low consumption, in particular in its implementation by a low-power oscillator.

In this regard, it is highlighted that the present solution does not require a high accuracy in the time count, so that using resources that are not excessively expensive in terms of energy and area occupation for the implementation of this time counter is actually possible.

Advantageously, the solution described, being integrated in the gyroscope device (in particular in the ASIC electronic circuit coupled to the detection structure within the package of the same gyroscope device), does not require the intervention of the external electronic system (or of the user), neither to know the time elapsed from the power-down nor to wait or verify that the mobile mass is stationary before activating a start-up.

The solution described has no impact on cold start-up times and allows for shorter hot start-up times (since, as previously discussed, the adjustment by the control stage 5 may envisage eliminating or reducing the duration of one or more of the sub-phases into which the start-up phase is normally divided).

Furthermore, this solution is not affected by the errors induced by the use of the oscillation detection signal, which has a reduced value during the start-up phase, since the mobile mass oscillation is deduced in an indirect, but in any case sufficiently accurate manner, from the measurement of the time elapsed from the power-down (related to the decay time of the oscillation, which is also known or in any case can be obtained).

Finally, it is clear that modifications and variations may be made to what has been described and illustrated herein, without thereby departing from the scope of the present disclosure, as defined in the attached claims.

In particular, it is highlighted that the solution described may find advantageous application in any (monoaxial, biaxial or triaxial) gyroscope device or in other combined devices which envisage gyroscopic sensors and possible further sensors (for example accelerometer sensors), such as for example in Inertial Measuring Units (IMU).

Furthermore, it is again highlighted that the described solution applies whatever is the actual implementation of the start-up phase (for example, whatever is a corresponding division into sub-phases).

A microelectromechanical gyroscope device (1) may be summarized as including a detection structure (2), provided with a mobile mass; and an integrated electronic circuit (4), coupled to the detection structure (2) and configured to provide a bias signal ($S_b$) to the detection structure (2) to cause its oscillation at a resonance frequency and to acquire a detection signal ($S_d$) from the detection structure (2) indicative of a detected angular velocity, wherein, upon powering of the gyroscope device (1), the integrated electronic circuit (4) is configured to implement a start-up phase, following a previous power-down, during which the mobile mass is biased to have an increase in the oscillation up to a target oscillation amplitude, followed by a maintenance phase at the target oscillation amplitude, wherein the integrated electronic circuit (4) includes a time counter stage (12) designed to measure a duration of a time interval from the previous power-down and is configured to adjust biasing of the mobile mass during said start-up phase as a function of the measured duration of said time interval.

The integrated electronic circuit (4) may be configured to: carry out a comparison between the measured duration of said time interval and a wait interval associated with a decay time of the mobile mass oscillation; and adjust biasing of said mobile mass during said start-up phase on the basis of said comparison.

A value of said wait interval may be a function of a quality factor (Q) of the mobile mass of said detection structure (2).

Said integrated electronic circuit (4) may include a non-volatile memory (14), configured to store a value ($T_{MEM}$) of said wait interval.

Said integrated electronic circuit (4) may be configured to: activate said time counter stage (12) and start a pre-power down phase upon receipt of a power-down signal ($P_{DOWN}$) designed to cause turn-off of the gyroscope device (1); and adjust biasing of said mobile mass during said start-up phase as a function of the measured duration of said time interval, which may elapse between the reception of the power-down signal ($P_{DOWN}$) and the reception of a start-up signal ($P_{UP}$) designed to cause powering of the gyroscope device (1), in the event that the measured duration is shorter than said wait interval.

Said integrated electronic circuit (4) may be configured to cause turn-off of said gyroscope device (1) and of said time counter stage (12) if said measured duration reaches said wait interval.

Said start-up phase may be divided into a plurality of sub-phases; and said integrated electronic circuit (4) may be configured to adjust biasing of said mobile mass during said start-up phase by eliminating one or more of said sub-phases and/or reducing a predetermined duration for one or more of said sub-phases.

Said integrated electronic circuit (4) may include a control stage (5) and a biasing stage (6), controlled by the control stage (4) to implement the biasing of said detection structure (2).

Said time counter stage (12) may include an oscillator.

A method for operating a microelectromechanical gyroscope device (1) provided with a detection structure (2) having a mobile mass and with an integrated electronic circuit (4), coupled to the detection structure (2) and configured to provide a bias signal ($S_b$) to the detection structure (2) to cause its oscillation at a resonance frequency and to acquire a detection signal ($S_d$) from the detection structure (2) indicative of a detected angular velocity, said method may be may be summarized as including, upon powering of the gyroscope device (1), implementing a start-up phase, following a previous power-down, wherein the mobile mass is biased to have an increase in the oscillation up to a target oscillation amplitude, followed by a maintenance phase at the target oscillation amplitude, including detecting a duration of a time interval from the previous power-down; and adjusting biasing of said mobile mass during said start-up phase as a function of the measured duration of said time interval.

The method may include carrying out a comparison between the measured duration of said time interval and a wait interval associated with a decay time of the mobile mass oscillation; and adjusting biasing of said mobile mass during said start-up phase on the basis of said comparison.

The method may include determining a value of said wait interval, as a function of a quality factor (Q) of the mobile mass of said detection structure (2).

The method may include activating a count of the duration of said time interval and starting a pre-power down phase when a power-down signal ($P_{DOWN}$) is received designed to cause turn-off of the gyroscope device (1); and adjusting biasing of said mobile mass during said start-up phase as a function of the measured duration of said time interval, which elapses between the reception of the power-down signal ($P_{DOWN}$) and the reception of a start-up signal ($P_{UP}$) designed to cause powering of the gyroscope device (1), in the event that the measured duration is shorter than said wait interval.

The method may include causing the turn-off of said gyroscope device (1) and of said time counter stage (12) if said measured duration reaches said wait interval.

Said start-up phase may be divided into a plurality of sub-phases; and may include adjusting the biasing of said mobile mass during said start-up phase by eliminating one or more of said sub-phases and/or reducing a predetermined duration for one or more of said sub-phases.

Said sub-phases may include a first sub-phase, starting-up the mobile mass oscillation; a second sub-phase, maintaining the mobile mass oscillation; and a third sub-phase, applying full energy for a predefined time; and adjusting the biasing of said mobile mass during said start-up phase including: if the duration of said time interval is shorter than half of a decay time of the mobile mass oscillation, eliminating the first and the third sub-phases and implementing only the second sub-phase; if the duration of said time interval is between ½ and ¾ of said decay time, eliminating the first sub-phase and shortening the third sub-phase; and if the duration of said time interval is between ¾ of said decay time and said decay time, eliminating the first sub-phase only.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope device, comprising:
   a detection structure that includes a mobile mass; and
   an integrated electronic circuit, coupled to the detection structure and the integrated electronic circuit configured to:
      provide a bias signal to the detection structure to cause oscillation at a resonance frequency;
      acquire a detection signal from the detection structure indicative of a detected angular velocity;
      receive a power-down signal;
      receive a start-up signal;
      implement a start-up phase in response to the start-up signal that is received after a previous power-down phase, during the start-up phase the integrated electronic circuit is configured to:
         bias the mobile mass to increase the oscillation up to a target oscillation amplitude; and
      implement a maintenance phase in response to the target oscillation amplitude, the integrated electronic circuit includes:
      a time counter configured to measure a duration of a time interval from the previous power-down phase,
   the integrated electronic circuit is configured to:
      compare the measured duration of the time interval and a wait interval associated with a decay time of the oscillation; and
      bias the mobile mass during the start-up phase in response to the comparison.

2. The device according to claim 1 wherein a value of the wait interval is a function of a quality factor of the mobile mass of the detection structure.

3. The device according to claim 1 wherein the integrated electronic circuit includes a non-volatile memory, configured to store a value of the wait interval.

4. The device according to claim 1 wherein the integrated electronic circuit is configured to: activate the time counter and start a pre-power down phase upon receipt of a power-down signal configured to cause turn-off of the gyroscope device; and bias the mobile mass during the start-up phase as a function of the measured duration of the time interval, which elapses between the reception of the power-down signal and the reception of the start-up signal, in the event that the measured duration is shorter than the wait interval.

5. The device according to claim 4 wherein the integrated electronic circuit is configured to cause turn-off of the gyroscope device and of the time counter if the measured duration reaches the wait interval.

6. The device according to claim 1 wherein the start-up phase is divided into a plurality of sub-phases; and wherein the integrated electronic circuit is configured to bias the mobile mass during the start-up phase by eliminating one or more of the sub-phases.

7. The device according to claim 1 wherein the start-up phase is divided into a plurality of sub-phases; and wherein the integrated electronic circuit is configured to bias the mobile mass during the start-up phase by reducing a predetermined duration for one or more of the sub-phases.

8. The device according to claim 1 wherein the integrated electronic circuit comprises a control stage and a biasing stage, controlled by the control stage to implement the biasing of the detection structure.

9. The device according to claim 1 wherein the time counter comprises an oscillator.

10. A method, comprising:
    operating a microelectromechanical gyroscope device having a detection structure with a mobile mass, the operating being by an integrated electronic circuit, coupled to the detection structure;
    oscillating the detection structure at a resonance frequency with a bias signal from a biasing stage of the integrated electronic circuit;
    receiving a start-up signal;
    implementing a start-up phase in response to the start-up signal which is after a previous power-down phase;
    biasing the mobile mass to increase in the oscillation to a target oscillation amplitude;
    implementing a maintenance phase in response to reaching the target oscillation amplitude;
    detecting a duration of a time interval from the previous power-down phase;
    carrying out a comparison between the detected duration of the time interval and a wait interval associated with a decay time of the mobile mass oscillation; and
    biasing the mobile mass during the start-up phase based on the comparison.

11. The method according to claim 10, comprising determining a value of the wait interval, as a function of a quality factor of the mobile mass of the detection structure.

12. The method according to claim 10, comprising: activating a count of the duration of the time interval and starting a pre-power down phase when a power-down signal is received designed to cause turn-off of the gyroscope device; and adjusting biasing of the mobile mass during the start-up phase as a function of the detected duration of the time interval, which elapses between the reception of the power-down signal and the reception of a start-up signal designed to cause powering of the gyroscope device, in the event that the detected duration is shorter than the wait interval.

13. The method according to claim 12, comprising causing the turn-off of the gyroscope device and of a time counter stage if the detected duration reaches the wait interval.

14. The method according to claim 10 wherein the start-up phase is divided into a plurality of sub-phases; comprising adjusting the biasing of the mobile mass during the start-up phase by eliminating one or more of the sub-phases and/or reducing a predetermined duration for one or more of the sub-phases.

15. The method according to claim 14 wherein the sub-phases comprise:
a first sub-phase, starting-up the mobile mass oscillation;
a second sub-phase, maintaining the mobile mass oscillation; and
a third sub-phase, applying full energy for a predefined time;
and wherein adjusting the biasing of the mobile mass during the start-up phase comprises:
if the duration of the time interval is shorter than half of a decay time of the mobile mass oscillation, eliminating the first and the third sub-phases and implementing only the second sub-phase;
if the duration of the time interval is comprised between ½ and ¾ of the decay time, eliminating the first sub-phase and shortening the third sub-phase; and
if the duration of the time interval is comprised between ¾ of the decay time and the decay time, eliminating the first sub-phase only.

16. A method, comprising:
receiving a first power-down signal with an integrated circuit that is coupled to a detection structure of a micro-electromechanical system;
initiating a first pre-power down phase by starting a counter;
determining whether a time count value of the first pre-power down phase is greater than or less than a wait time interval;
receiving a start-up signal before the time count value exceeds the wait time interval;
biasing the detection structure as a function of the time count value.

17. The method of claim 16, comprising receiving a second power down signal with the integrated circuit and initiating a second pre-power down phase by starting the counter.

18. The method of claim 17, comprising determining whether a time count value of the second pre-power down phase is greater than or less than the wait time interval.

19. A microelectromechanical gyroscope device, comprising:
a detection structure that includes a mobile mass; and
an integrated electronic circuit, coupled to the detection structure and the integrated electronic circuit configured to:
provide a bias signal to the detection structure to cause oscillation at a resonance frequency;
acquire a detection signal from the detection structure indicative of a detected angular velocity;
receive a power-down signal;
receive a start-up signal;
implement a start-up phase in response to the start-up signal that is received after a previous power-down phase, during the start-up phase the integrated electronic circuit is configured to:
bias the mobile mass to increase the oscillation up to a target oscillation amplitude; and
implement a maintenance phase in response to the target oscillation amplitude,
wherein the integrated electronic circuit includes a time counter configured to measure a duration of a time interval from the previous power-down phase, and is configured to bias the mobile mass during the start-up phase as a function of the measured duration of the time interval,
wherein the start-up phase is divided into a plurality of sub-phases, and the integrated electronic circuit is configured to bias the mobile mass during the start-up phase by eliminating one or more of the sub-phases or reducing a predetermined duration for one or more of the sub-phases.

20. A method, comprising:
operating a microelectromechanical gyroscope device having a detection structure with a mobile mass, the operating being by an integrated electronic circuit, coupled to the detection structure;
oscillating the detection structure at a resonance frequency with a bias signal from a biasing stage of the integrated electronic circuit;
receiving a start-up signal;
implementing a start-up phase in response to the start-up signal which is after a previous power-down phase, the start-up phase being divided into sub-phases;
biasing the mobile mass to increase in the oscillation to a target oscillation amplitude;
implementing a maintenance phase in response to reaching the target oscillation amplitude;
detecting a duration of a time interval from the previous power-down phase; and
biasing the mobile mass during the start-up phase as a function of the measured duration of the time interval; and
adjusting the biasing of the mobile mass during the start-up phase by eliminating one or more of the sub-phases or reducing a predetermined duration for one or more of the sub-phases.

* * * * *